United States Patent
Muiter et al.

(10) Patent No.: US 9,623,624 B2
(45) Date of Patent: Apr. 18, 2017

(54) WRAPPED PART ASSEMBLY WITH EDGE/CORNER DEFINING INSERTS

(71) Applicant: Ford Global Technologies, LLC, Dearborn, MI (US)

(72) Inventors: James Hadley Muiter, Plymouth, MI (US); Alan Curtis Moran, Jr., Canton, MI (US); Shariq Alam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/536,744

(22) Filed: Nov. 10, 2014

(65) Prior Publication Data

US 2016/0129659 A1    May 12, 2016

(51) Int. Cl.
| | |
|---|---|
| *B32B 3/04* | (2006.01) |
| *B32B 37/14* | (2006.01) |
| *B32B 25/16* | (2006.01) |
| *B32B 37/12* | (2006.01) |
| *B32B 7/12* | (2006.01) |
| *B32B 7/08* | (2006.01) |

(Continued)

(52) U.S. Cl.
CPC .................. *B32B 3/04* (2013.01); *B32B 5/18* (2013.01); *B32B 25/04* (2013.01); *B32B 25/14* (2013.01); *B32B 25/16* (2013.01); *B32B 37/12* (2013.01); *B32B 37/142* (2013.01); *B60R 13/02* (2013.01); *B29C 65/02* (2013.01); *B32B 3/10* (2013.01); *B32B 7/08* (2013.01); *B32B 7/12* (2013.01); *B32B 37/08* (2013.01); *B32B 2266/08* (2013.01); *B32B 2305/022* (2013.01); *B32B 2307/536* (2013.01); *B32B 2605/00* (2013.01); *B32B 2605/003* (2013.01); *Y10T 156/1034* (2015.01)

(58) Field of Classification Search
CPC ....... B32B 3/04; B32B 3/10; B32B 2605/003; B32B 37/142; B32B 2605/022; B32B 2266/08; B32B 25/16; B32B 7/08; B32B 7/12; B32B 2605/08; B32B 2605/00; B32B 37/08; B32B 2305/022; Y10T 156/1034; B60R 13/02; B29C 65/02
USPC ....................................................... 156/245
See application file for complete search history.

(56) References Cited

U.S. PATENT DOCUMENTS

| | | | | |
|---|---|---|---|---|
| 3,333,286 | A | * | 8/1967 | Biolik .................. A47C 20/021 5/632 |
| 3,520,755 | A | * | 7/1970 | Raffaelli, Sr. ............. B26F 3/06 156/199 |

(Continued)

*Primary Examiner* — Philip Tucker
*Assistant Examiner* — Vicki Wu
(74) *Attorney, Agent, or Firm* — Vichit Chea; Brooks Kushman P.C.

(57) ABSTRACT

An insert is assembled to a base interior part at either an edge or a corner of the part that is later wrapped with a cut and sewn jacket cover. The assembly comprises a substrate, an insert and a cover. The substrate has a base edge and the insert has a contour defining edge attached to the substrate with the contour defining edge aligned with the base edge. The cover is wrapped over the insert and the substrate to provide a wrapped edge that covers over the contour defining edge. A method of manufacturing a covered interior part of a vehicle comprises securing an insert having a contour defining edge to the interior panel and wrapping the insert and the interior panel with a cover.

7 Claims, 4 Drawing Sheets

(51) Int. Cl.
  *B60R 13/02* (2006.01)
  *B32B 5/18* (2006.01)
  *B32B 25/04* (2006.01)
  *B32B 25/14* (2006.01)
  B32B 37/08 (2006.01)
  B32B 3/10 (2006.01)
  B29C 65/02 (2006.01)

(56) References Cited

U.S. PATENT DOCUMENTS

| | | | | |
|---|---|---|---|---|
| 4,857,376 A | * | 8/1989 | Von Reis | B32B 3/04 296/84.1 |
| 4,970,742 A | * | 11/1990 | Keener | A47C 20/027 5/633 |
| 5,272,779 A | * | 12/1993 | Payton | A47C 31/001 5/698 |
| 5,425,567 A | * | 6/1995 | Albecker, III | A47C 1/146 297/377 |
| 6,685,862 B1 | * | 2/2004 | Hanagan | B29C 44/086 156/213 |
| 8,616,608 B1 | | 12/2013 | Pores | |
| 8,728,604 B2 | * | 5/2014 | Setoguchi | B29C 44/1257 264/46.5 |
| 2006/0029789 A1 | * | 2/2006 | Donatti | B29C 44/1238 428/304.4 |
| 2008/0044658 A1 | * | 2/2008 | Ludwig | B29C 44/1271 428/411.1 |
| 2010/0237677 A1 | * | 9/2010 | Nam | A47C 7/38 297/410 |
| 2010/0272955 A1 | * | 10/2010 | Chimelak | B32B 5/18 428/138 |
| 2012/0025566 A1 | | 2/2012 | Wisniewski et al. | |

* cited by examiner

WRAPPED PART ASSEMBLY WITH EDGE/CORNER DEFINING INSERTS

TECHNICAL FIELD

This disclosure relates to parts that are wrapped with a decorative covering material that are provided with sharp corners or edges.

BACKGROUND

Vehicles such as automobiles, trucks, boats, airplanes and the like may offer interior parts that are provided with surfaces that are wrapped with covering materials, such as leather or other premium materials. For example, interior panels such as door inner panels, instrument panels and interior trim pieces may be covered with hand-wrapped genuine leather covers. The covers may be cut and sewn jackets that are wrapped onto metal or plastic base level interior panels that are sold without leather wrapping.

Base level interior panels (lower trim level interior panels that have less features and may be offered at a lower price) may be prepared for wrapping by removing an outer surface area to accommodate the increased thickness of the finished wrapped assembly. Interference with adjacent parts caused by the leather wrap may be eliminated by milling critical areas of the base level interior part. For example, the surface of a base level instrument panel may be milled in the area of an air vent insert that is assembled to an opening defined by the leather wrapped part as a plug-in part.

Wrapping a base level interior part with leather tends to create a wrapped part that has edges and corners that are more rounded (have a larger corner radius) than the base level interior parts. The edges of such parts must match the edges of other parts such as the plug-in air vents described above that may have square edges that are designed to be received into openings in the base level interior parts. Undesirable wide gaps may be defined between edges and mating parts (for example, between assembled parts and the leather wrapped parts or between leather wrapped parts and doors or other closure panels) if the edges are rounded when the parts are wrapped with cut and sewn jackets.

This disclosure is directed to solving the above problems and other problems as summarized below.

SUMMARY

An insert that defines a sharp edge is proposed to be assembled to a base interior part at either an edge or a corner of the part that is later wrapped with a cut and sewn jacket cover. The insert can be used for edges or corners where the tightness of the wrap or interference with an adjacent part is a concern. The sharp edge of the insert is positioned at an edge or corner where sharpness of the interior part is important. The insert may be attached by fastening mechanisms such as tacks, staples, or an adhesive. The fastening mechanisms may be molded into the insert. The base level interior part may be machined (milled or bored) or molded with locating features designed to receive the insert.

The corners or edges formed on the insert may be sharp corners formed by a raised rib or may be provided with a ball end or cylindrical edge. The height of the raised rib, ball end or cylindrical edge may be determined based upon the suppleness of the wrapping material.

The insert may be made from a relatively rigid plastic but can be made from ethylene propylene diene monomer (EPDM) rubber or another elastomer or polymer that has the appropriate hardness to define the corner area after being wrapped with a covering material. To achieve the desired balance of suppleness and rigidity at the edge or corner, other materials such as a closed cell foam, a two-shot injection molded material, or the like may be used to form the insert.

According to one aspect of this disclosure, an assembly is provided that comprises a substrate, an insert and a cover. The substrate has a base edge and the insert has a contour defining edge attached to the substrate with the contour defining edge aligned with the base edge. The cover is wrapped over the insert and the substrate to provide a wrapped edge that covers over the contour defining edge.

According to other aspects of this disclosure, the insert may have an inner surface attached to the substrate and an outer surface oriented to face away from the substrate. The contour defining edge has an edge radius that is smaller than a nominal radius of the base edge. The contour defining edge extends outwardly from the outer surface (or "A" side) away from the inner surface (or "B" side).

The insert may have a first leg that is attached to a facing wall of the substrate and a second leg that is attached to a recess defining wall of the substrate that extends into the substrate from the facing wall. The contour defining edge is formed at the intersection of the first wall and the second wall. Alternatively, the insert may have a first leg that is attached to a facing wall of the substrate and a second leg that is attached to a recess defining wall of the substrate that extends into the substrate from the facing wall. The contour defining edge is provided on the first leg adjacent the intersection of the first wall and the second wall to extend from the outer surface away from the inner surface.

The base edge may extend about an external corner of the substrate with the contour defining edge of the insert paralleling the base edge. The insert may include a ball-shaped end at the external insert corner.

The assembly may further comprise means for attaching the insert to the substrate. The means for attaching the insert may be an adhesive applied between the insert and the substrate for securing the insert to the substrate. Alternatively, the attachment means may be a mechanical fastener connecting the insert to the substrate.

Another aspect of this disclosure relates to a method of manufacturing a covered part for a vehicle. The method includes the steps of selecting an interior panel that includes an edge, securing an insert having a contour defining edge to the interior panel with the contour defining edge spaced from and parallel to the edge of the substrate, and wrapping the insert and the substrate with a cover that defines a corner over the contour defining edge.

According to other aspects of the method, the method may include the further step of milling the interior panel in an area adjacent the edge to provide clearance relative to an adjacent part to the covered part. Alternatively, the method may include the step of molding a recessed area on the interior panel in an area adjacent the edge to provide clearance relative to a part that is adjacent to the covered part, and then assembling the insert onto the recessed area.

The method may further comprise applying an adhesive between the insert and the interior panel, and securing the insert to the interior panel with the adhesive. Alternatively, the method may include the step of fastening the insert to the interior panel with a mechanical fastener to connect the insert to the interior panel.

The above aspects of this disclosure and other aspects will be described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
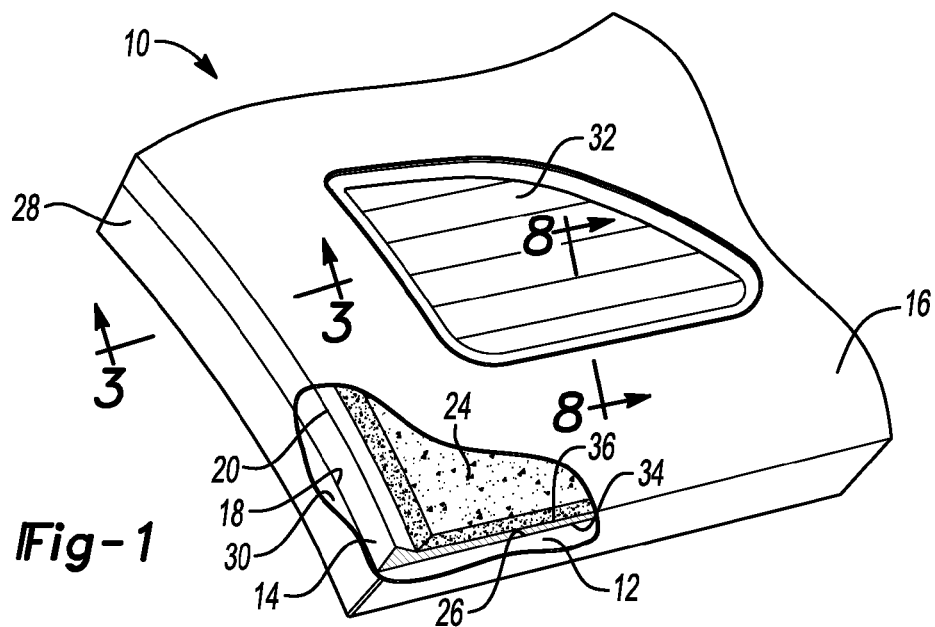
FIG. 1 is a fragmentary perspective view of a portion of an interior panel that has a covering material wrapped over a contour defining insert with part of the covering material partially removed for visibility.

Referring to FIG. 1, a wrapped interior part assembly 10, or "assembly", is illustrated that includes a substrate part 12 on which an overlaid insert 14 is assembled prior to covering the assembly with a cover 16. The substrate part 12 may be an interior part for a car, such as a dashboard, interior door panel, console, glove box door, seat, or the like.

The insert 14 is assembled to the substrate part 12 near a base edge 18 of the substrate part 12. The insert 14 includes a contour defining edge 20 that is positioned in alignment with the base edge 18. The contour defining edge 20 is outboard of the base edge 18 and provides a sharp feature line when the cover 16 is wrapped over the assembly and insert and substrate 12.

While not necessary in every assembly 10, a spacer 24 may be assembled between the substrate part 12 and overlaid insert 14 to provide a cushioned feel that emphasizes the suppleness of a leather cover 16. The spacer 24 may be a foam layer or sheet. The spacer 24, as shown in FIG. 1, extends across the substrate part 12 and partially over the overlaid insert 14, but does not extend across the contour defining edge 20. In several of the embodiments to be described below, the spacer 24 extends over the contour defining edge 20.

The substrate part 12 includes a facing wall 26, or outer surface, of the substrate part 12. In many applications, the substrate part may be a vinyl part that includes the Class A surface of the part. Higher level trim is provided by wrapping the substrate part 12 with a premium covering material, such as leather. While leather is the most common premium covering material, the cover may also be made of other premium fabrics or materials. In many instances, the substrate part 12 is milled or machined to provide clearance for the wrapped cover 16 in areas where the assembly 10 may interfere with assembled parts or adjacent vehicle components. The substrate part 12 may also include a side wall 28 that extends inwardly from the facing wall 26. The side wall 28 may also require machining to provide clearance for the addition of the cover 16 to the assembly 10.

A recess defining wall 30 may be provided that extends inwardly relative to the facing wall 26. The recess defining wall 30 defines a recess, or opening, in the substrate part 12 that may be used to insert an attachment 32, such as an air vent, trim piece, or the like. Alternatively, the wall 30 may be adapted to receive a different part or may be aligned with another plug-in part. The attachment 32 may be a snap-in part, adhesively secured part, or otherwise fastened to the substrate part 12 after the cover 16 is attached to the assembly 10. The overlaid insert 14 has an inner surface 34 that is placed in a face-to-face relationship on the facing wall 26 of the substrate part 12. The overlaid insert 14 also includes an outer surface 36 that faces away from the inner surface 34. The outer surface 36 is preferably tapered toward the substrate part 12 facing wall 26 to reduce the possibility that the insert may be discernable or detectable after the cover 16 is attached.

Figure 2:
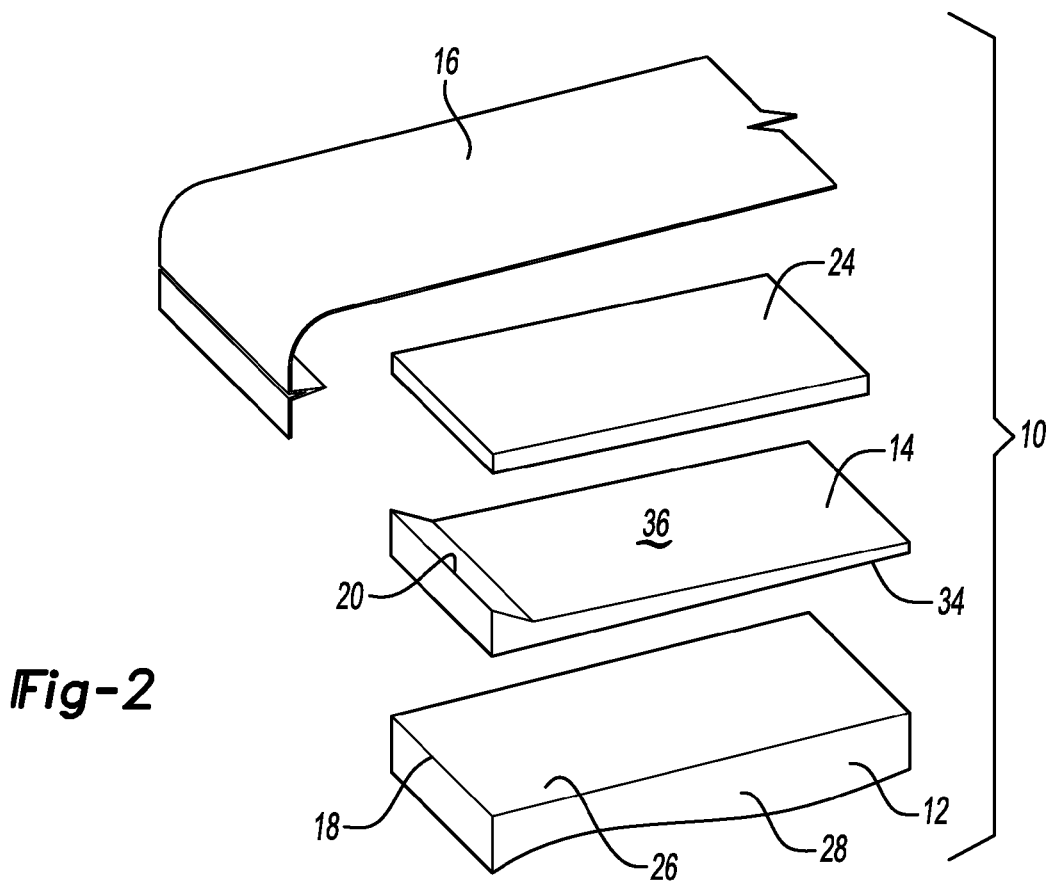
FIG. 2 is an exploded perspective view of an assembly made according to this disclosure.

Referring to FIG. 2, the assembly 10 is shown as an exploded perspective view of a small segment of the assembly 10. The assembly 10 includes the substrate part 12 that includes the base edge 18. The substrate 12 includes a facing wall 26 and a side wall 28 that are covered by the cover 16 when it is wrapped over the assembly 10. The insert 14 provides the contour defining edge 20 when it is assembled onto the substrate 12 with the contour defining edge 20 generally following the base edge 18. The inner surface 34 of the insert 14 is attached to the facing wall 26 of the substrate 12. The outer surface 36 of the insert 14 faces in generally the same direction as the facing wall 26 of the substrate 12. The outer surface 36 tapers toward the facing wall 26 of the substrate part 12. The spacer 24 is shown disposed between the outer surface 36 of the insert 14 and the cover 16.

Figure 3:
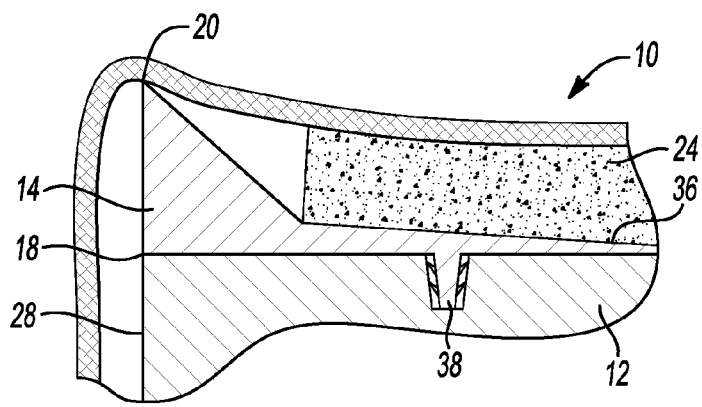
FIG. 3 is a fragmentary cross-sectional view taken along the line 3-3 in FIG. 1 of one embodiment of an assembly made according to this disclosure.

FIGS. 3-8 illustrate several different embodiments of the assembly 10 that include several different types of inserts. Referring to FIG. 3, an insert 14 that is like the insert shown in FIGS. 1 and 2 is shown assembled to a substrate 12. The substrate 12 defines a base edge 18 while the insert 14 includes the contour defining edge 20. The spacer 24 may extend across the outer surface 36 of the insert 14 and over the contour defining edge 20 to also cover the side wall 28 of the assembly 10. A snap-in fastener 38 may be provided as an integrally molded part of the insert 14 to secure the insert 14 to the substrate 12. Alternatively, the snap-in fastener may be a screw or separate snap-in fastener 38 as shown below and described with reference to FIG. 4.

Figure 4:
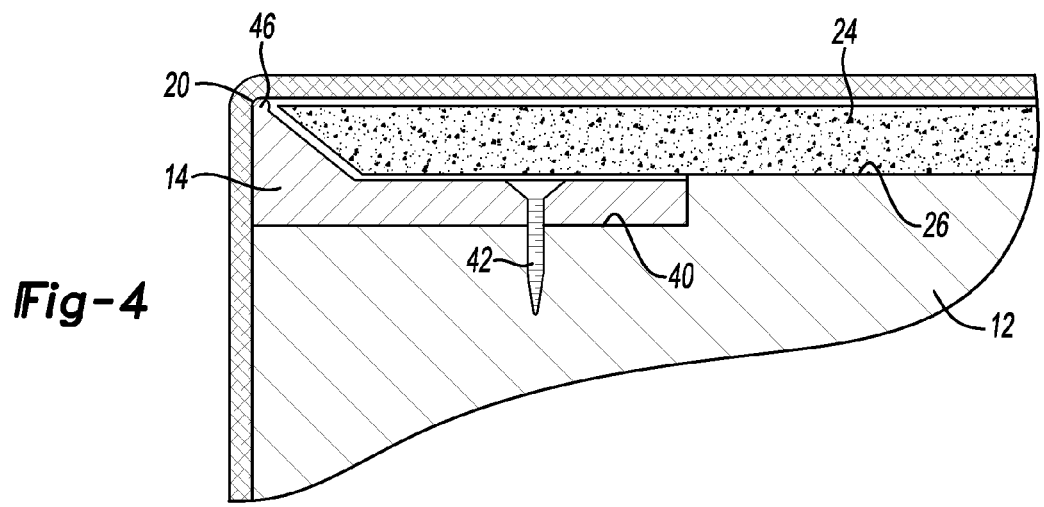
FIG. 4 is a fragmentary cross-sectional view similar to FIG. 3 of another embodiment of an assembly made according to this disclosure.

Referring to FIG. 4, the insert 14 is shown to be assembled into an outer surface recess 40 that is formed in the facing wall 26 of the substrate part 12. A screw 42 is shown that is used to secure the insert 14 to the substrate part 12. A spacer 24 is assembled over the insert 14 and the facing wall 26 of the substrate 12. The recess 40 locates the insert on the substrate 12. The recess 40 may be formed by machining or milling the surface of the substrate 12 to remove material from the substrate 12. Alternatively, the substrate part 12 may be molded to define the recess 40. The substrate 12 may be bored to form a hole or opening to receive the screw 42 or the snap-in fastener 38 (shown in FIG. 3).

A cylindrical area 46 may be provided at the contour defining edge 20 to provide a more durable contour defining edge 20 that provides a small radius contour defining edge 20 instead of a sharp point, as shown in FIGS. 1-3.

Figure 5:
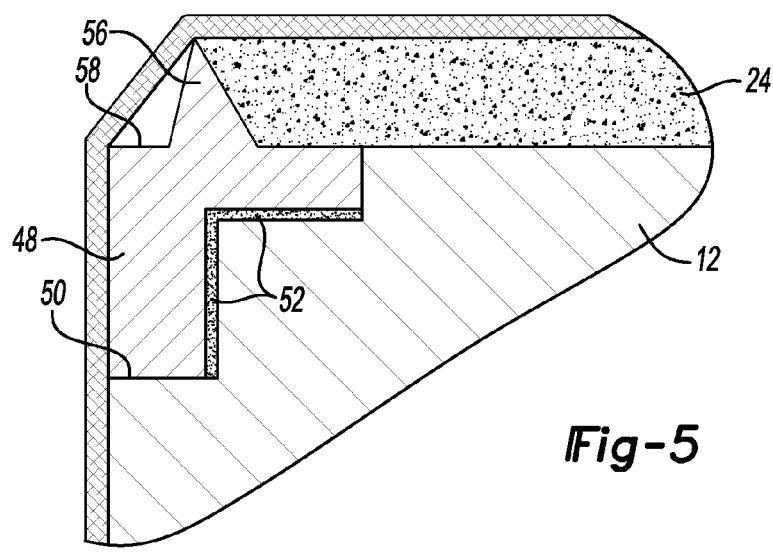
FIG. 5 is a fragmentary cross-sectional view similar to FIG. 3 of another embodiment of an assembly made according to this disclosure.

Referring to FIG. 5, a corner insert 48 is shown to be installed in a recess 50. The corner insert 48 may be secured to the substrate 12 by an adhesive 52. An inverted V-shaped protrusion 56 is provided on the corner insert 48 at a location that is recessed laterally relative to the side wall 28. The inverted V-shaped protrusion 56 is provided on a top surface 58 of the corner insert 48. A spacer 24 is assembled over the top surface 58 and the substrate 12 before it is covered by the cover 16.

Figure 6:
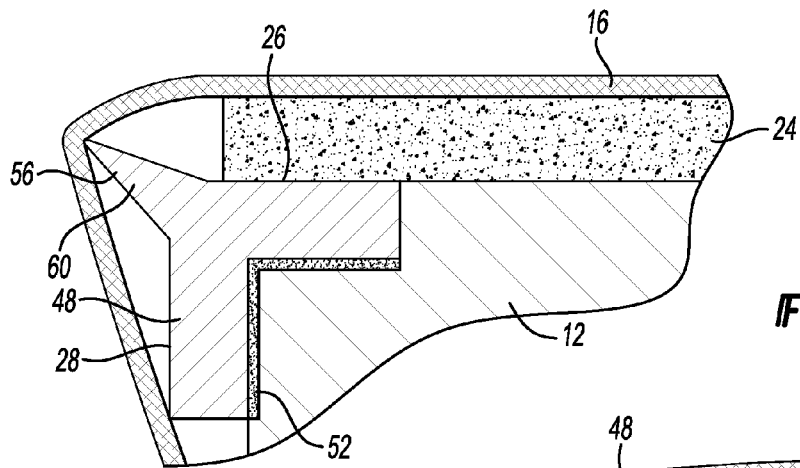
FIG. 6 is a fragmentary cross-sectional view similar to FIG. 3 of another embodiment of an assembly made according to this disclosure.

Referring to FIG. 6, another embodiment of a corner insert 48 is shown that is secured by an adhesive 52 to the substrate 12. The corner insert 48 includes an inverted V-shaped protrusion 56 that is located at a corner 60 of the corner insert 48. The V-shaped protrusion 56 extends diagonally relative to the facing wall 26 and side wall 28 of the corner insert 48. The spacer 24 is assembled over the corner insert 48 and the substrate 12, but does not extend over the V-shaped protrusion 56. The cover 16 is assembled over the insert 48, substrate 12 and spacer 24.

Figure 7:
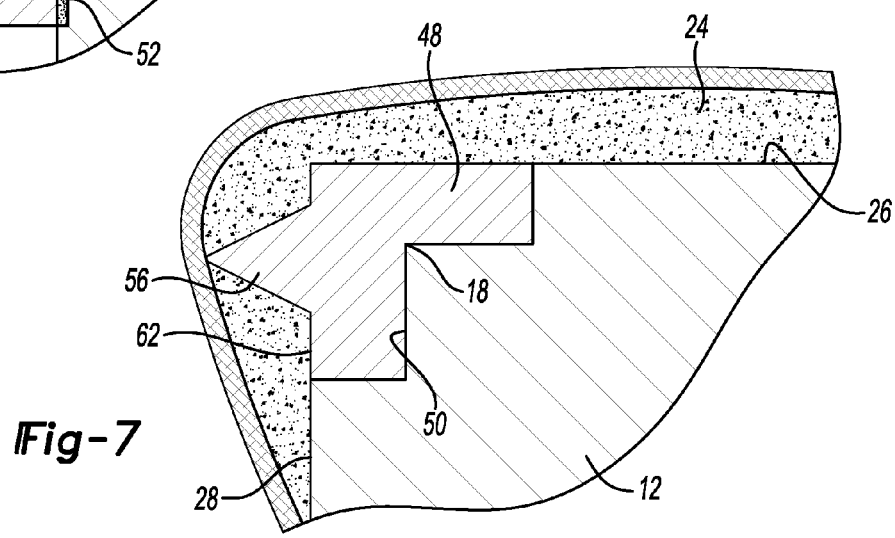
FIG. 7 is a fragmentary cross-sectional view similar to FIG. 3 of another embodiment of an assembly made according to this disclosure.

Referring to FIG. 7, another corner insert 48 is illustrated that is assembled over the base edge 18 of the substrate 12. The inverted V-shaped protrusion 56 extends from a side portion 62 of the insert 48. The insert 48 is assembled into a recess 50 that is formed either by machining or molding in the substrate 12 as previously described. The spacer fabric 24 is shown to be assembled over the facing wall 26 and side wall 28. The spacer 24 also extends over the protrusion 56 and the insert 48.

Figure 8:
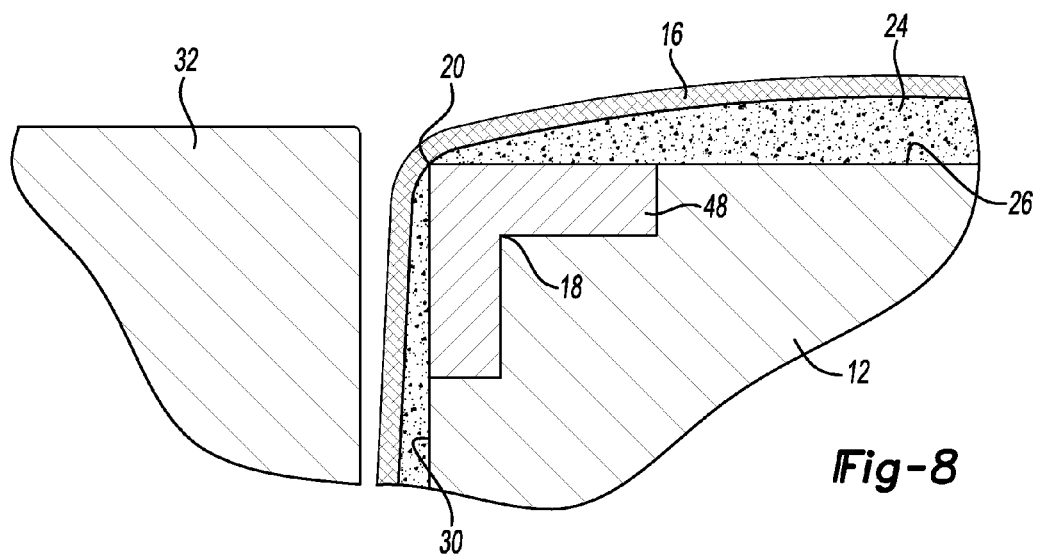
FIG. 8 is a fragmentary cross-sectional view taken along the line 8-8 in FIG. 1 of another embodiment of an assembly made according to this disclosure.

Referring to FIG. 8, this view is taken as a cross-sectional view in FIG. 1 to show the application of the corner insert 48 in a recess defining wall 30 that is adapted to receive an attachment 32, such as an air vent or trim piece. The corner insert 48 is assembled to the substrate 12 to provide a sharp corner in the area where the attachment 32 is adjacent to the substrate 12. The insert 48, shown in FIG. 8, does not include a protrusion, but is L-shaped and extends along the edge of the substrate with the base edge 18 and substrate 12 being inboard of the contour defining edge 20. The cover 16 and the foam spacer 24 extend across the facing wall 26, the corner insert 48 and the recess defining wall 30.

Figure 9:
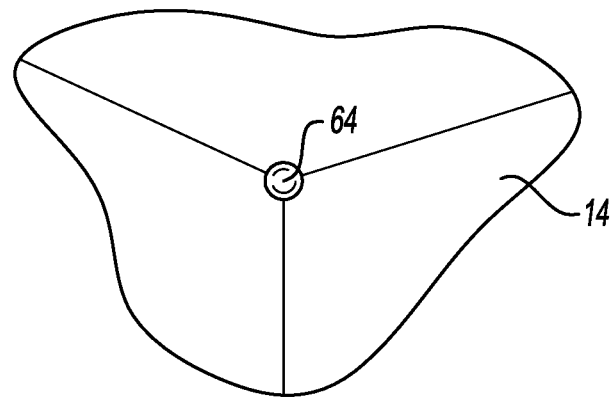
FIG. 9 is a fragmentary perspective view of an insert that defines a rounded corner at the apex of three sides of the insert.

Referring to FIG. 9, a ball-shaped rounded corner 64 is illustrated that may be provided on the insert 14 shown in FIGS. 1-4 or on a corner insert 48 as shown in FIGS. 5-8. The ball-shaped rounded corner 64 provides a slightly rounded end of small radius. The ball-shaped rounded corner 64 reduces the sharpness of the finished corner and reduces any tendency to pierce the cover 16.

Figure 10:
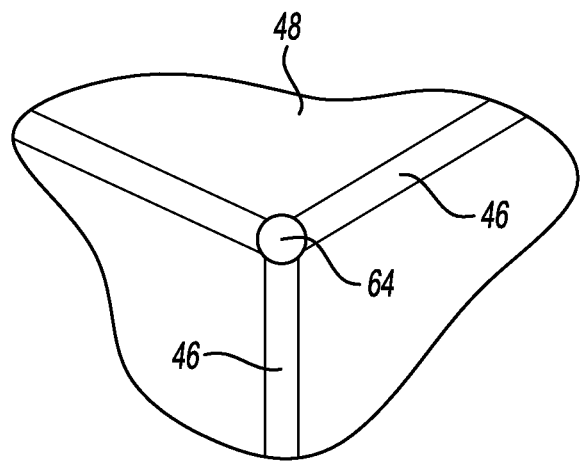
FIG. 10 is a fragmentary perspective view of another insert that defines a rounded corner at the apex of three sides of the insert and a cylindrical edge at the intersection of two of the sides.

Referring to FIG. 10, another alternative embodiment of a corner insert 48 is shown that includes a ball-shaped rounded corner 64 that is provided where three faces intersect on the insert. Cylindrical edges 46 are provided on the edges that lead to the ball-shaped rounded corner 64. The cylindrical edges 46 provide a rounded linear edge between two faces of the insert 48. The rounded corner 64 or cylindrical edge 46 provide a smaller radius surface over which the cover 16 is wrapped, as described with reference to FIGS. 1-8 above.

While the embodiment of FIGS. 1-4 is shown with the triangular protrusion 22 extending upwardly relative to the substrate part 12, it should be understood that the triangular protrusion may be oriented in a diagonal direction similar to the protrusion 56 shown in FIG. 6 or may extend over the side wall 28 of the substrate 12 similar to the corner insert 48 shown in FIG. 7.

The structural elements shown and described with reference to the drawings may be modified or combined with other structural features shown in the other figures of the drawings. The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of manufacturing a covered part comprising:
selecting an interior panel that includes a substrate edge;
selecting an insert made of rigid plastic and having an insert edge;
securing the insert to the interior panel with the insert edge spaced from and parallel to the substrate edge;
wrapping both the insert and the interior panel with a cover, wherein the cover wraps directly around the insert edge to define a covered corner of the covered part; and
assembling a spacer onto the insert after the insert is secured to the interior panel and before wrapping the insert and the interior panel with the cover, wherein the spacer is positioned on the insert to extend over the insert edge.

2. The method of claim 1 wherein the spacer is positioned on the insert at a location adjacent the insert edge.

3. The method of claim 1 further comprising:
machining the interior panel to form a recessed area adjacent the substrate edge to provide clearance between an adjacent part relative to the covered part; and
assembling the insert onto the recessed area.

4. The method of claim 1 further comprising:
molding a recessed area on the interior panel in an area adjacent the substrate edge to provide clearance between an adjacent part relative to the covered part; and
assembling the insert onto the recessed area.

5. The method of claim 1 further comprising:
applying an adhesive between the insert and the interior panel; and
securing the insert to the interior panel with the adhesive.

6. The method of claim 1 wherein the insert is made of ethylene propylene diene monomer.

7. A method of manufacturing a part comprising:
securing an interior panel having a substrate edge to an insert made of rigid plastic that has an insert edge with the insert edge spaced from and parallel to the substrate edge;
subsequently assembling a spacer onto the insert extending over the insert edge; and subsequently wrapping the insert and the interior panel with a cover directly around the insert edge to define a covered corner.

* * * * *